United States Patent [19]

Matzkanin

[11] Patent Number: 4,706,650
[45] Date of Patent: Nov. 17, 1987

[54] SOLAR COLLECTOR ASSEMBLY AND KIT

[75] Inventor: Randy L. Matzkanin, Coral Gables, Fla.

[73] Assignee: Alternative Energy Resources, El Paso, Tex.

[21] Appl. No.: 890,719

[22] Filed: Jul. 25, 1986

Related U.S. Application Data

[63] Continuation-in-part of Ser. No. 738,354, May 28, 1985, Pat. No. 4,622,951.

[51] Int. Cl.$^4$ ............................................. F24J 2/56
[52] U.S. Cl. ................................. 126/450; 126/434; 126/435; 126/437; 52/222
[58] Field of Search ............... 126/450, DIG. 2, 445, 126/446, 433–437, 448; 52/90, 222, 656; 160/354, 355, 368, 380

[56] References Cited

U.S. PATENT DOCUMENTS

| | | | |
|---|---|---|---|
| 4,084,578 | 4/1978 | Ishibashi | 126/437 |
| 4,240,405 | 12/1980 | French | 126/433 |
| 4,252,109 | 2/1981 | Newton | 126/450 |
| 4,361,134 | 11/1982 | Bowen | 126/450 |

Primary Examiner—James C. Yeung
Attorney, Agent, or Firm—Fred A. Keire

[57] ABSTRACT

A solar collector water heater is provided in kit form suitable for installation by a homeowner using a minimum of ordinary tools. The kit includes a rectangular insulation board serving as a baseboard, and a solar absorber plate mountable on the insulation board and including a heat exchanger with couplings for connection to a tank. A thermosiphon water tank is provided together with couplings for connecting to the heat exchanger. A main frame is assembled of a rear rail, a pair of side rails, and a front rail, all of extruded aluminum, using corner keys for adjoining adjacent ones of these rails at their ends. At least one side glazing panel having a top surface and a pair of legs inwardly disposed therefrom is cooperatively retained within the assembly by a first depression formed in one of the rail members insertably receiving and retaining one of the legs and a second depression formed in a glazing rim insertably receiving and retaining another of the legs. The top surface of the side-glazing panels being cooperatively retained adjacent to one of the rail members by a side cap and also retained adjacent to the glazing rim by an upper cap. A least one front glazing panel is also securely retained within the solar collector water heater within an opening formed between the glazing rim and the upper cap. The upper cap includes a projection extending downwardly therefrom which cooperates with a flange outwardly disposed from the glazing rim to cooperatively retain the front glazing panel within the opening.

37 Claims, 5 Drawing Figures

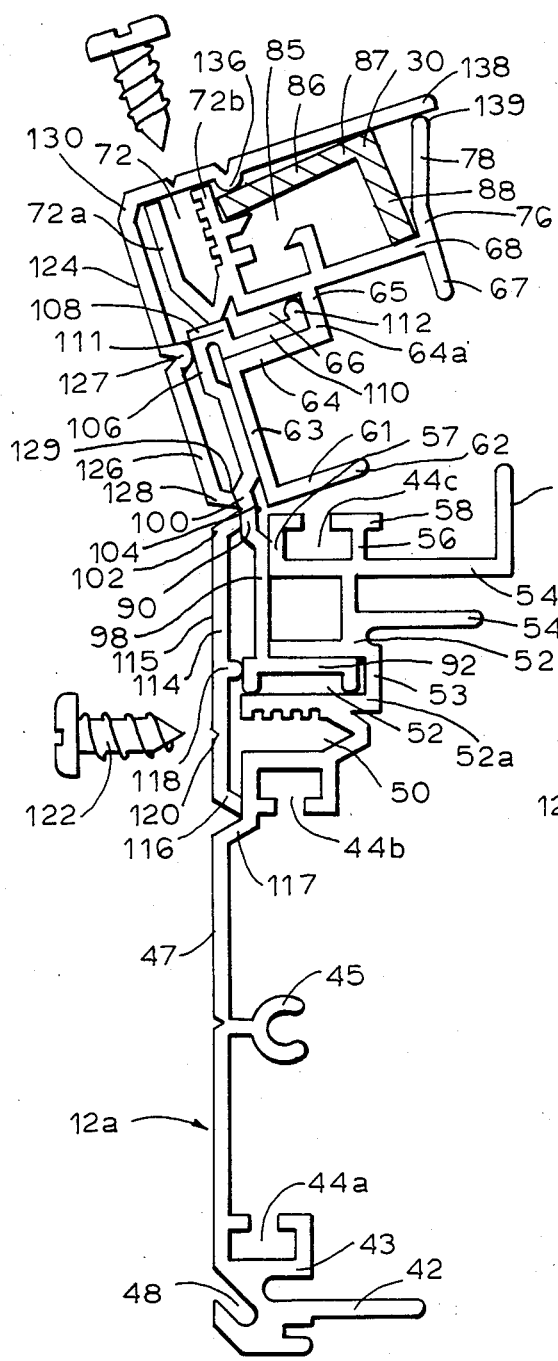
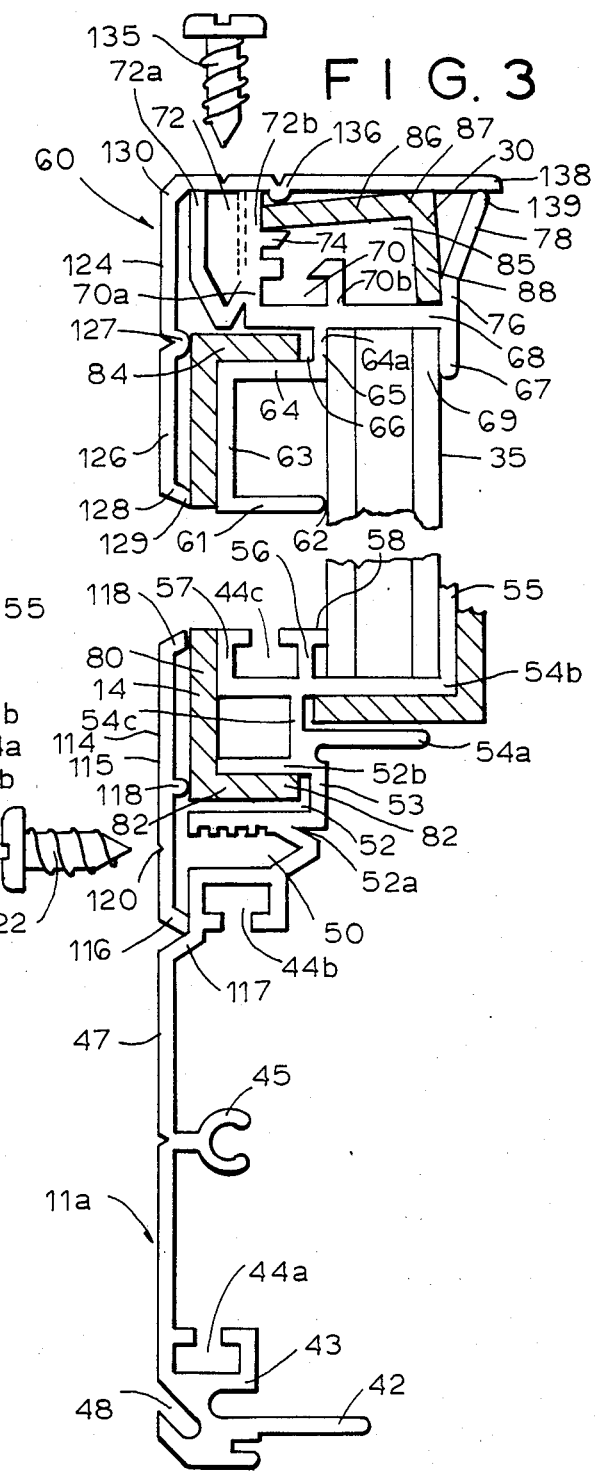
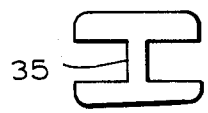

4,706,650

SOLAR COLLECTOR ASSEMBLY AND KIT

This application is a continuation-in-part of U.S. Pat. applicaton Ser. No. 738,354 filed May 28, 1985 not U.S. Pat. No. 4,622,951.

The present invention is directed towards solar energy utilization, and is particularly directed to a passive solar water heating system which lends itself to easy assembly; more particularly this invention relates to a passive home solar water heating unit which is affordable due to its ease of assembly and installation and its expected long lasting working life.

BACKGROUND OF THE INVENTION

A passive solar water heating system does not have any moving parts or require any pumping and piping assemblies which call for recirculation of the heat transfer fluid and the like. As a result, a passive solar water heating system is highly desirable if it can satisfy the requirements of a typical household user, such as in the Southwest United States and elsewhere in the United States where the available solar energy is capable of supplying almost all the heated water needs.

As it is well known, an active solar water heating system is a fairly expensive heating system and is only affordable because of the various tax credit incentives which have been provided for installation of these systems in a typical household. However, with the proposed elimination of these subsidies, the competitive advantage of a passive solar water heating system is clearly evident. Nevertheless, a passive solar water heating system has not been available which would be readily assembled and readily useful for a number of households, such as for the Southwest United States. Because of the fairly expensive installation techniques, these assemblies have been prohibitive to the economically less well positioned population.

BRIEF DESCRIPTION OF THE INVENTION

The present passive solar heating system, such as for heating household water, is affordable to a greater number of households. This solar water heating unit is easy to install. It is a supplemental heating system for a typical household, and it is affordable because of the ease of assembly and installation, at the same time having an expected long working life. All of the parts of the units are packaged in a manner such that a single person or at most two persons can handle the entire unit, and the dimensions of the containers for these units are such that they may be easily shipped or transported by homeowners. This advantage then makes the present unit affordable for a number of households which heretofore could not afford the solar water heating units. These water heating units, depending on the particular climate and location in which the units may be used, may supply either entirely the entire household hot water requirements or augment these requirements to such a degree that the savings over a fairly short period of time are manifested to the household, taking into account the capital investment and the savings in fuel costs and the like.

Consequently, the present unit is especially suitable for installation with the parts being assembled by the homeowner in a suitable location on the ground and then being carried onto the roof for final assembly. These assembly steps make it especially advantageous for a homeowner to realize the benefits of solar heating without the disadvantages heretofore encountered with the conventional active solar heating units.

Thus making available to a greater population a solar heating unit in the form in which it can readily be assembled and installed has been a desideratum in the solar heating field. The present unit accomplishes this objective.

Thus, it is an object of this invention to provide a passive solar water heating device which can be purchased in kit form and installed by a consumer without unusual difficulty. It is another object of this invention to provide a passive solar water heating arrangement which is simple and reliable, and which, after installation, is highly efficient, dependable, and does not require significant maintenance.

It is a more particular object of this invention to provide the solar water heating system in a kit form wherein the parts are lightweight and of modular design, and can be cooperatively retained together using only a minimum number of household tools and of a weight capable of being handled by one or at most two people.

According to an aspect of this invention, the solar collector water heater is formed of parts suitable for installation by a homeowner, and comprises a rectangular insulation board serving as a base or backboard, a solar absorber plate to be mounted on the insulation board, and including a heat exchanger at one end thereof with couplings for connection to a tank; a water tank having a main water inlet and a heated water outlet, as well as other inlets and outlets and connecting pipes for connecting to the couplings of the heat exchanger; a main frame assembly, which is to be assembled around the insulation board over which the solar absorber plate is mounted, including modular extruded aluminum front, rear, and side rails, with corner keys for adjoining adjacent ones of these rails at their ends to form the frame; a tank bed which is attached within the frame for securely mounting the tank; and at least one glazing panel formed of a sheet of transparent material such as Tedlar film (sold by DuPont) which is stretched onto the frame. Preferably, a front glazing panel and a pair of side glazing panels are incorporated into the frame.

The front glazing panel frame is formed of rail members secured to one another to form a quadrilateral. The front glazing panel is securely retained within the solar collector water heater within an opening formed between a glazing rim and an upper cap. The upper cap includes a projection extending downwardly therefrom which cooperates with a flange outwardly disposed from the glazing rim. The upper cap protects the Tedlar adhesion stretched onto the front glazing panel from ultraviolet light as well.

In the preferred embodiment, side glazing panels with extruded aluminum rail extensions form a frame and have a sheet of Tedlar stretched over the frame. The side glazing panels include a top surface and a pair of legs inwardly disposed therefrom cooperatively retained within the assembly. A first depression formed in one of the rail members insertably receives and retains one of the legs. Another of the legs is insertably received and retained within a second depression formed in the glazing rim. The top surface of the side glazing panels are cooperatively retained adjacent to one of the rail members by a side cap and also retained adjacent to the glazing rim by an upper cap. The side cap also protects the Tedlar adhesion stretched onto the side glazing panels from ultraviolet light.

In the preferred embodiment, the solar collector plate, with its associated heat exchanger, heats the water in the tank by the thermosiphon effect, so no moving parts are involved.

The solar collector water heater of this invention can be installed easily on any of a large variety of roofs without difficulty, and provides a secure, water-tight seal, between the outside environment and the inside of the structure on which the solar water heater is mounted. The solar collector disclosed herein is further advantageous in that the extrusions do not have to be held in close tolerance to provide consistency in the end fit.

BRIEF DESCRIPTION OF THE DRAWINGS

The above and many other objects, features, and advantages of this invention will be more fully understood from the following detailed description of a preferred embodiment, which is to be considered in connection with the accompanying drawings, wherein

FIG. 2 is a cross-sectional view of the modular assembly of the front of the solar collector water heater assembly of FIG. 1;

FIG. 3 is a cross-sectional view of the modular assembly of the sides of the solar collector water heater assembly of FIG. 1;

FIG. 3A is a cross-section of one of the other elements of the preferred embodiment of this invention.

BRIEF DESCRIPTION OF THE INVENTION

Figure 1:
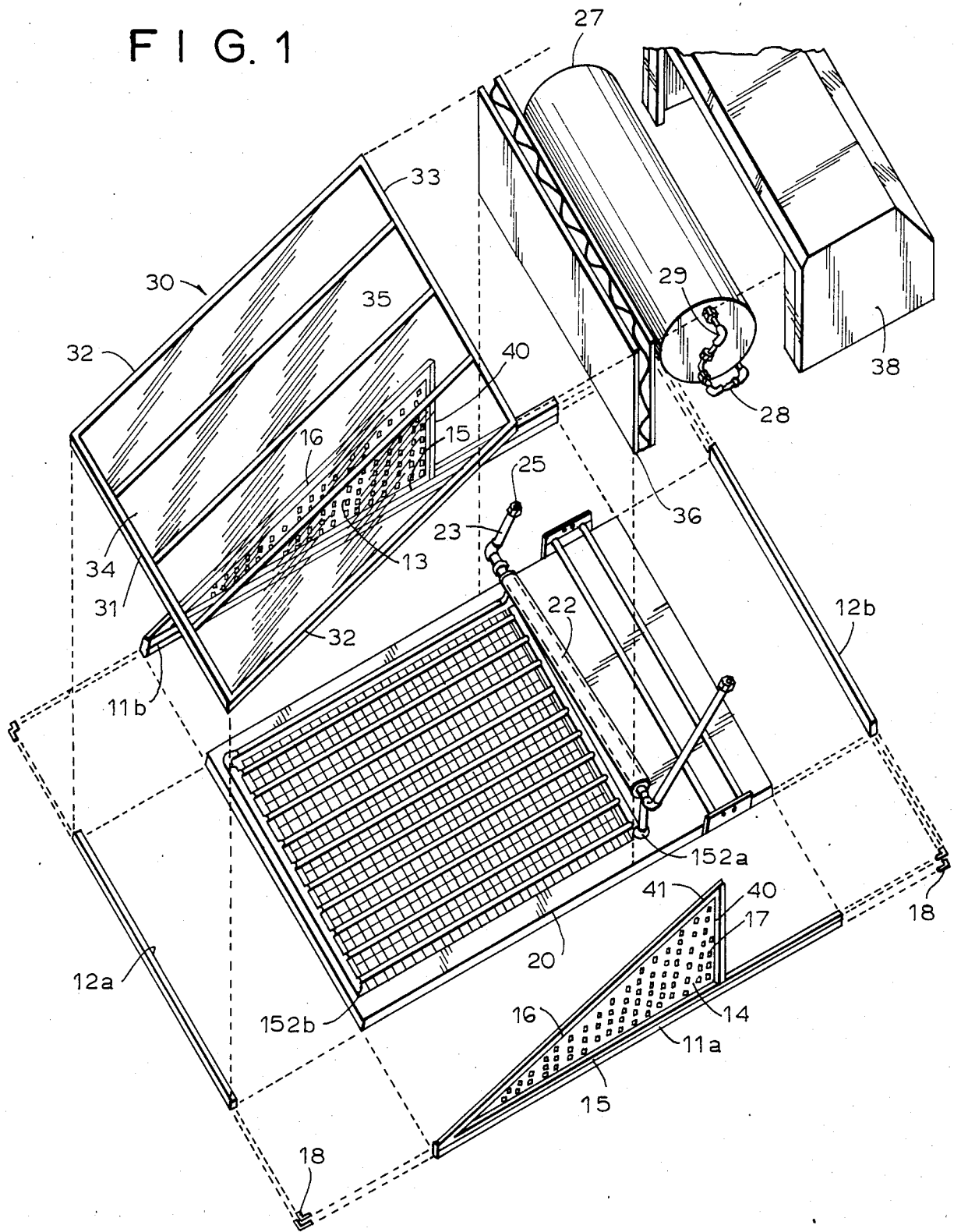
FIG. 1 is an exploded view of a solar collector water heater assembly, according to one preferred embodiment of this invention.

With reference to the drawings, and initially to FIG. 1 thereof, a solar collector assembly is formed of a pair of modular side rails 11a, 11b, and a modular front rail 12a and a modular rear rail 12b, each of which have generally similar structure as discussed later in connection with FIGS. 2 and 3.

A left side glazing panel 13 and a right side glazing panel 14 are each formed of a lower rail extension 15 and an upper rail extension 16, with a Tedlar or other suitable generally solar radiant heat transparent film 17 being stretched over the frame formed by the rail extensions 15 and 16.

L-shaped corner keys 18 fit into mating structure at the ends of the main frame rails 11a, 11b, 12a, 12b, so that the latter form a generally rectangular quadrilateral frame. Spring clips (not shown) on the keys 18 secure them to the frame.

An insulating backboard 20 serves as a base on which is mounted a solar collector absorber plate 21 (discussed later in detail with respect to FIG. 4).

The absorber plate 21 has a tube-in-tube type heat exchanger 22 mounted at the upper edge thereof, with inlet and outlet riser pipes 23 and 24 at its ends. Pipe unions 25 are provided at the upper ends of these riser pipes 23 and 24.

A tank bed 26 is formed of straps of L-shaped cross section extending between flanges, so that the tank bed 26 fits snugly onto the baseboard 20.

A main water tank 27, as an illustration is a twentynine gallon cylindrical tank. Tank 27 rests securely on the tank bed 26, and has pipes 28a and 28b, inlet and outlet, respectively to connect to a main water supply and to a home hot water system, as well as pipes 29a and 29b to connect to the unions 25 of the pipes 24 and 23, respectively.

A modular front glazing panel 30 consists of a frame that is formed of a front film rim 31, a pair of side film rims 32 and a rear film rim 33, with a film 34 of Tedlar or other suitable membrane being stretched over the frame 31, 32, 33. Support struts 35 (shown in cross section in FIG. 3A) are connected to the front and rear rims 31, 33, generally parallel to the side rims 32, and serve to support the film 34.

An end wall board 36, backed with fiberglass butt is fastened or spot welded onto shroud 38. The tank shroud 38, preferably formed of sheet steel lined with R26 insulation, provides a decorative and protective cover for the tank 27. The shroud 38 is open at the bottom side thereof, and has holes along its mouth permitting the shroud to be affixed by screws or the like to other members of the assembly, e.g. main frame rails 11a, 11b and 12b.

Risers 40 which connect the rear ends of the rail extensions 15 and 16 can have metal or wood flanges for fastening to the end wall board 36 by screws or the like.

The rail 11a of the main assembly frame, the rail extensions 15 and 16, and the film rim 32 are shown in cross section in FIGS. 2 and 3. These elements are all formed of extruded aluminum for light weight and durability, and their novel construction, as illustrated in FIGS. 2 and 3, also permits ease of assembly. Of course other suitable materials are suggested such as other metals or structural plastics, e.g. fiberglass reinforced plastics.

The main frame rails 11a, 11b (rails 12a and 12b being of similar construction) have spaced-apart horizontal flanges 42 and 43, with the backboard 20 fitting above these flanges. These main frame rails form the basic structural framework for the collector. Several keyways 44a, 44b, and 44c are provided to fit the corner keys 18. Main rails 11a, 11a, 12a and 12b may also include a C-section member 45 inwardly disposed therefrom which is adaptable for use if the present invention is used as an air collector. A vertical web 47 extends from the flange 43 to the key hole 44b, and has an angled groove 48 at its foot for securing the rail 11a, 11b to a sleeper or to a roofer member (not shown).

The rail members 11a, 11b, also include a screw boss 50 formed therein above the key hole 44b. The screw boss 50 is preferably dimensioned to fit a #10 sheet metal screw. The upper member of screw boss 50 forms a web member 52a. A parallel web member 52b outwardly disposed from the rail members forms a depression 52 therebetween having a base 53. Web members 52a and 52b and base 53 define depression 52. Another depression 54 is inwardly disposed from the rail member and positioned above depression 52. Depression 54 is formed by web members 54a and 54b and base 54c. A flange member 55 extends upwardly from an end of web member 54b.

On the opposite of web member 54b from flange member 55, another key hole 44c is formed in the rail member. Key hole 44c includes side members 56 and 57 which extend upwardly from web members 54. Side member 57 includes a flange 58 outwardly disposed thereof.

A glazing rim 60 is placed within the assembly in a position to be securely retained on top of the rail members 11a, 11b, 12a and 12b and provides a means for retaining and securing the panel glazings within the assembly. The structure of glazing rim 60 will be described herein beginning with those features adjacent to the rail members. Glazing rim 60 includes an inwardly disposed flange 61 which terminates at a free end 62. Flange 61 provides a base for glazing rim 60. A generally vertical web member 63 extends upwardly from flange 61. Another flange 64 is inwardly disposed from vertical web member 63 and is oriented within the glazing rim parallel to flange 61. A frame member 64a extends upwardly from flange 64 and provides support for a central web or frame member 68 of the glazing rim.

The present invention also includes structure to reliably retain the struts within the assembly. A frame member 67 extends downwardly from central web member 68 parallel to frame member 66. A notch 69 is formed by side frame members 66 and 67, as well as central web member 68. One end of the strut 35 may be insertably retained within the notch 69 between side members 66 and 67. The other end of the strut is retained between flange members 55 and 58 of the rail members.

Additional features of glazing rim 60 extend upwardly from central web member 68. A key hole 70 is formed by frame members 70a, 70b extending upwardly from central web member 68. A screw boss 72 extends upwardly from central web member 68 and provides for retention of a fastener which securely retains an upper cap to the glazing rim, which will be discussed below. The screw boss 72 includes side members 72a and 72b. A flange 74 extends outwardly from side member 72b of screw boss 72. At the end of central web member 68 opposite to screw boss 72, a vertical web member 76 extends upwardly therefrom. Vertical web members 76 includes a slanted portion 78 extending outwardly therefrom.

As disclosed herein, the rail members 11a, 11b and the glazing rim provide a means for receiving and securely retaining at least one side glazing panel 14. This glazing panel 14 preferably forms a ¾ by ½ by ⅛ angle frame of Tedlar. Each side glazing panel 14 includes a top surface 80 and legs 82 and 84 inwardly disposed from the ends of top surface 80. Leg member 82 is received within depression 52 formed in rail member 11a, 11b tightly abutting web member 52b. Leg member 84 is received by depression 65 formed within the glazing rim 60 and tightly abuts against flange 64. In this position, top surface 80 abuts the free end of web member 52b, side 57 of key hole 44c and vertical web member 63 of glazing rim 60.

As best illustrated in FIG. 2, the front rail 12a and the front film rim 31, and hence, glazing rim 60 are retained and connected adjacent to one another within the assembly by a connector 90. Connector 90 includes a base member 92 having abutment posts 94 and 96 extending downwardly therefrom and is sized to provide a tight fit of bottom web member 92 within depression 52. A generally vertical web member 98 extends upwardly from bottom web member 92 and abuts the end of member 92b and side 57 of key hole 44c. Vertical web member 98 terminates at a central section 100 which includes a generally arcuate upper and lower surface 102 and 104, respectively. Another generally vertical web member 106 extends upwardly from central section 100 inclined from generally vertical web member 98. Inclined section 106 terminates at an upper web member 108 inwardly disposed therefrom. Upper web member 108 generally includes an upper surface 110 horizontally positioned below upper web member 108 by a distance defined by an abutment post 111. Another abutment post 112 is positioned parallel to abutment post 111, both post 111 and 112 being sized so that upper web member 108 fits snugly within depression 65. As a result of this specific configuration of the connector 90, rail members 12a and 12b are cooperatively retained adjacent to front film rim 31, and hence, glazing rim 60.

As shown in FIG. 3, a side cap 114 and an upper cap 124 cooperatively retain the side glazing panels within the assembly. The side cap acts as a protection cap as well as a finishing mold, aiding in support of the side glazing panel forming the ¾ by ½ by = angle Tedlar frame. The side cap protects the Tedlar stretched onto the side glazing panel from direct ultraviolet light. Side cap 114 includes a pair of generally inclined legs 116 and 118 extending inwardly from the ends of the top surface 115 thereof. Lower leg 116 is restrained from further downward movement by an inclined section 117 formed on the rail member upwardly disposed from vertical web member 47. Upper inclined leg 118 abuts top surface 80 of side glazing panel 14 such that the panel is cooperatively retained adjacent side member 57 of key hole 44c. Side cap 114 also includes a projection 116 inwardly disposed therefrom which abuts leg 82 of the side glazing panel and thereby cooperatively retains leg 82 within depression 52 abutting web member 52b. A groove 120 disposed within top surface 115 is aligned with screw boss 50 formed in the rail members such that a fastener 122, such as a screw, rivet or the like may be insertably received therethrough and cooperatively retained within screw boss 50 to securely retain and position side cap 114 adjacent to rail members 11a, 11b.

As shown in FIG. 2, and specifically referring to rail members 12a and 12b, inclined leg 116 of side bar 114 is restrained from further downward movement by inclined portion 117 extending from vertical web member 47 of the rail members. The other inclined leg member 118 is cooperatively retained adjacent to connector 90 by the upper arcuate surface 102.

As a result of the force being applied thereto, projection 118 securely retains bottom web member 92 within depression 52. As aforedescribed, a screw 122 may be inserted through groove 20 and received and retained within screw boss 52 to securely retain side bar 114 adjacent to rail members 12a and 12b.

The front glazing panel 30 is cooperatively retained within an opening 85 formed between an upper cap 124 and glazing rim 60. The structure of upper cap 124 also securely retains glazing rim 60 within the solar collector water heater assembly.

The upper cap 124 protects both the side and front glazing panels from exposure to ultraviolet light. As best shown in FIG. 3, upper cap 124 includes a vertical member 126 which includes a protrusion 127 disposed inwardly thereof. Protrusion 127 snugly abuts leg 84 of side glazing panel 14 and tightly retains leg 84 within depression 65.

The vertical member 126 terminates at an inclined leg 128. The free end 129 of inclined leg 128 tightly abuts top surface 80 of side glazing panel 14 and cooperatively retains the top surface between upper cap 124 and the generally vertical web member 63 of the glazing rim within the assembly.

A corner section 130 is formed at the upper end of vertical member 126 opposite to inclined leg 128. A generally horizontal section 132 extends inwardly from corner section 130. Horizontal section 132 includes a groove 134 which receives a fastener 135 therethrough. The fastener is tightly retained within screw boss 72 to securely retain upper cap 124 adjacent to glazing rim 60. The generally horizontal section 132 of upper cap 124 also includes a projection 132 extending downwardly therefrom which cooperates in retaining the front glazing rim within the assembly, as will be discussed herein. The horizontal section 132 terminates in an inclined leg 138 which engages the end 139 of slanted member 78 of the glazing rim to restrain movement within the assembly of the glazing rim.

The design of the glazing rim and the upper cap and the cooperation therebetween as disclosed in the present invention securely retains the front glazing panel within an opening 85 formed therebetween. The front glazing panel is preferably made of $\frac{3}{4} \times \frac{1}{2} \times \frac{1}{8}$ angled aluminum with a Tedlar glazing adhered thereto. The protrusion 136 inwardly disposed from upper cap 124 and the flange 74 extending outwardly from side member 72b cooperatively retains a generally horizontal web member 86 of front glazing panel 30 within opening 85. The corner section 87 of front glazing panel 30 tightly abuts the generally horizontal section 132 of upper cap 124. As a consequence thereof, a generally vertical web member 88 extending downwardly from horizontal web member 86 is restrained from movement within opening 85 by central web member 68 and the side vertical web member 76 of the glazing rim. In this configuration, the front glazing panel is cooperatively retained within opening 85.

As is also shown in FIG. 2, the upper cap cooperates in retaining connector 90 within the assembly. The lower inclined leg 128 of upper cap 124 rests against and tightly abuts the upper arcuate surface 102 of the central section 100 of the connector. The projection 127 inwardly disposed from vertical member 126 tightly abuts against vertical section 106 of connector 92 thereby snugly retaining the upper web member 108 of connector 90 within depression 65 formed in the glazing rim. As a result of the cooperation between the side bar and the upper cap, connector 90 may securely retain the glazing rim adjacent to rail member 12a and 12b within the assembly.

As shown in FIG. 3, an L-shaped glazing panel may also be insertably retained within the depression 54 formed between sides 54a and 54b and base 54c with the vertical section of the glazing panel abutting upwardly extending member 55 of the rail assembly.

The design of the present invention also allows for the struts 35 to be securely retained within the assembly. The struts 35 increase the structural strength of the collector. One end of the strut is tightly retained within notch 69 formed between side member 65 and 67 of the glazing rim. The other end of the strut is tightly retained between upwardly extending member 55 and the outwardly disposed flange 58 from side web member 56 of key hole 44c. The strut is also retained from movement within this configuration by the free end 62 of the inwardly disposed flange 61 abutting the sides thereof.

As shown in FIG. 3A, the struts 35 can be extruded of aluminum in H-shaped cross section.

The principles for heating the water in the tank 27 from heat developed in the solar collector plate 21 can be explained with reference to FIG. 4. In this view, parts discussed earlier are identified with the same reference numerals as in FIG. 1, and will not be described in detail.

The heat absorber plate 21 of this embodiment is formed for example of eleven fin tubes 150, which are filled, e.g., with a fluorocarbon heat transfer fluid, for example, having a boiling point of about 38° F. A greater or less number may be used depending on the size of the installation as it is contemplated that various sized units may be demanded. Fins 151 extend laterally from these tubes 150, and are painted or coated with a selective absorber paint, so that the fins 151 absorb light of short wavelength, but do not as readily absorb or emit the longer infrared wavelengths. These paints are readily available. The tubes 151 extend between manifolds 152a and 152b, which in turn are connected by a riser tube 153 to the heat exchanger 22. The latter is a tube-in-tube heat exchanger having an outer tube 154 to which the heat transfer fluid is supplied from the riser tube 153, and a return tube 155 that connects to another manifold (not shown) for supplying the condensed refrigerant back to the tubes 150. An inner pipe 156 extends within the outer tube 154, and carries the tank water to be heated from the inlet pipe 23 to the outlet pipe 24.

Figure 4:
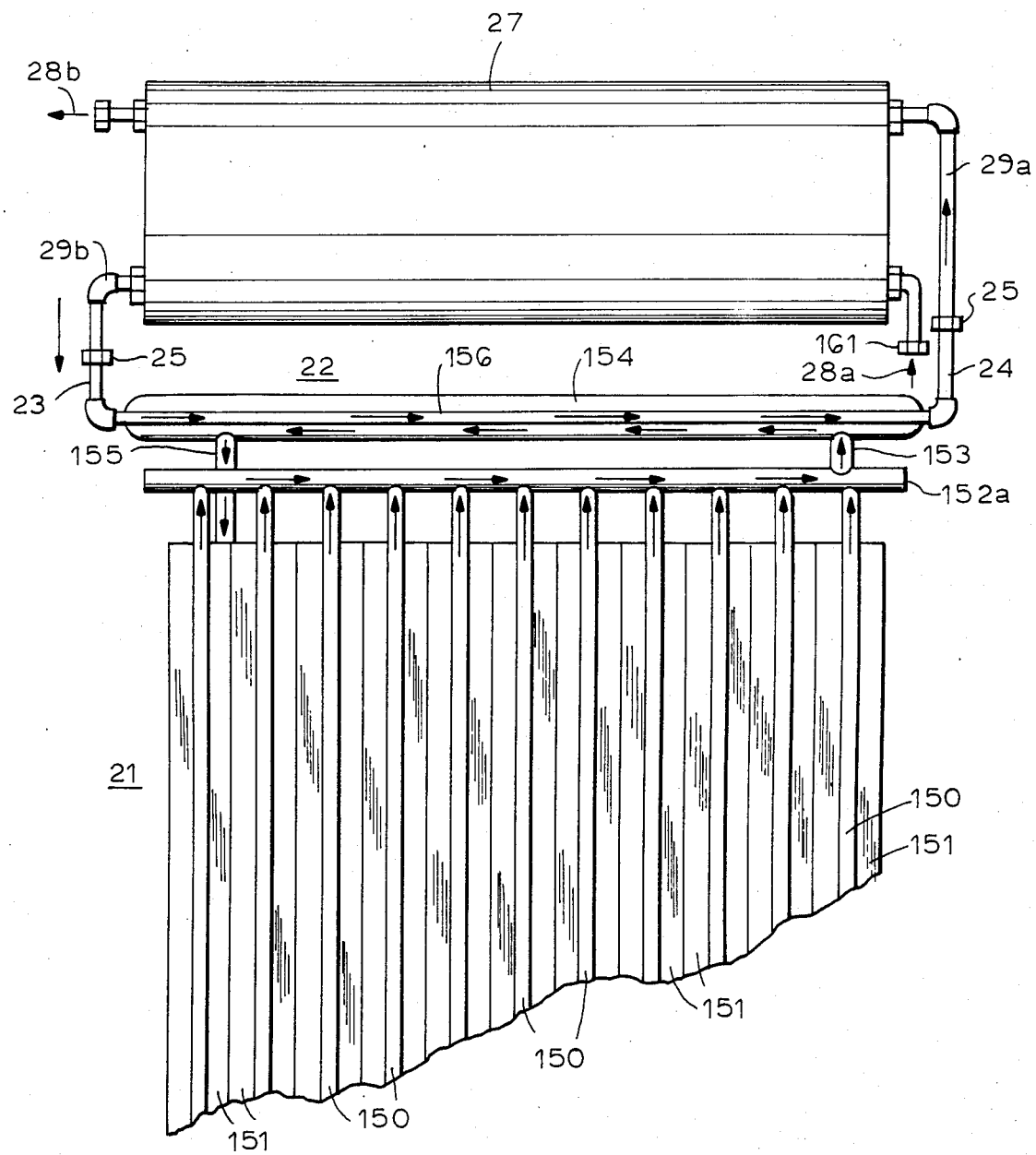
FIG. 4 is a general schematic illustrating the thermosiphon-effect operation of the solar water heater of this invention.

Generally, the absorber plate 21, the heat exchanger 22, and the tank 27 have the elevational relationships shown in FIG. 4, so that a thermosiphoning occurs through what is known as free convection.

Free convection or thermosiphoning circulation, comes about because of the varying densities of the fluids at different temperatures, and the force of gravity on them. As the water in the heat exchanger is heated, its density decreases, and this less dense, heated water rises through the pipes 24, 29a to the top of the tank 27, while the cooler denser water at the bottom of the tank 27 flows through the pipes 29b, 23 into the heat exchanger inner pipe 156. At the same time, solar radiation which impinges on the fins 151 of the solar collector absorber plate 21 heats the heat transfer fluid within the absorber tubes 150 and produces hot vapor. The latter proceeds through the manifold 152 and the riser pipe 153 to the annulus of the heat exchanger 22 between the outer pipe 154 and the inner pipe 156.

When these liquid-filled tubes 150 are exposed to sunlight, the liquid evaporates, and rises to the heat exchanger 22 as a gas. The heated gas surrounds the inner pipe 156 that is filled with the water flowing from the tank 27 and back into the tank. The water from the tank 27 is cooler than heat transfer fluid vapor, so the latter condenses and gives off its latent heat to the water. The water picks up the heat, rises in temperature, and then returns to the tank at the higher temperature, while the condensed heat transfer fluid returns through the return tube 155 to the absorber plate 21. This cycle repeats throughout the day, and accomplishes the heating of water in the tank 27 during the day. The thermosiphon effect will stop when either the water temperature is heated to the temperature of the refrigerant, or when, owing to a lack of sunlight, the refrigerant gas becomes as cool as the water.

In order to effect proper circulation of the refrigerant, the heat exchanger 22 is approximately two inches higher at the water outlet end (i.e., riser pipe 24) than at the inlet end (riser pipe 23).

The tube-in-tube heat exchanger 22 is favorably of the type known as the leak detector double augmented tube (LDDA tube) type heat exchanger available from Noranda Metal Industries, Inc., Newtown, Conn. The outer pipe 154 is a copper pipe. The LDDA tube is grooved on the inside surface in a circular pattern, and the outer surface of the inside pipe 156 is favorably a knurlled copper pipe. The knurling on the inner pipe 156 resembles tiny dimples and serves the dual purposes of increasing the surface area available for heat exchange, and of creating turbulence in the functional environment.

In the manufacture of the glazing panels 13, 14, 30 of the kit, the extruded aluminum rails 15, 16, 40 or 31, 32, 33, and hence 60, are cut to appropriate lengths, and the ends are mitered and the parts are keyed or welded together. The metal is prepared for glazing such as by etching or cleaning, and is then glazed with the Tedlar membrane. The glazing membrane is mounted onto the aluminum frames using a double-sided adhesive tape (not shown). Once the membrane or film is mounted, the frame is placed into a high-temperature oven for about ten minutes, for heat shrinking. After the glazing panel has been removed from the oven, as the film cools it will shrink and gradually pull itself taut.

The various parts of the absorber plate are connected together by brazing and soldering and by connecting the various pipes and unions, but this is performed during manufacturing but not in the assembly.

The various parts including the glazing panel assemblies 13, 14, 30, the rails 11a, 11b, 12a, 12b, the tank 27, the shroud 38, and the solar collector absorber plate and heat exchanger assembly 20, 21 can be packaged and sold as a kit to the homeowner or other consumer, who can then install the assembly on his own roof in a few hours.

At the beginning of an installation process, sleepers (not shown), which can be clear redwood or treated pine two-by-eight boards, suitably weatherproofed, are attached to the desired location on the building roof. These serve as a secure surface onto which the frame 11a, 11b, 12a, 12b can be attached, and distribute the weight of the completely filled solar collector water heater over a large roof area. A bed of plastic roof cement should be applied to the sleeper prior to its final fastening to the roof.

Supply and return piping should be run from a point in the water system in advance of the main home water heater to supply cold water to the tank 27, and to supply the solar heated water from the tank 27 to the water heater. The supply and return piping should be routed as closely as possible to the bottom of the collector so that the roof penetrations will be covered by the collector.

It is recommended that the components be carried to the roof individually to reduce the hoisted weight.

Once the roof-top preparations have been made, the preassembled frame can be carried to the roof and positioned over the stubbed pipe penetrating the roof. The frame should be assembled first by connecting the rails 11a, 11b, and 12b using the L-shaped corner keys 18, leaving the front rail 12a off for the time being. Then, the backboard insulation piece can be slid in between the flanges 42 and 43 of the rails 11a, 11b. At this time the front rail 11a is positioned and attached, and the tank bed 26 is fitted in. The absorber plate 21 is the placed over the insulation 20 and connected to the tank 27. After the tank 27 has been positioned it is strapped in place by using the straps and buckles (not shown) provided in the kit.

After the tank 27 is installed into the bed 26, the plumbing connections are connected to the appropriate pipes. The unions 25 are used to connect the pipes 23, 24 from the heat exchanger 22 to the inlet 29a and outlet pipes 29b of the tank 27. The male unions are sweat soldered to the pipe stubs penetrating the roof. If the tank and the penetrating pipe stubs are of two different metals, a dielectric union can be employed to prevent electrolytic deterioration.

The side panels 13 and 14 are securely retained on the frame rails 11a and 11b. Next, loose fiberglass filler is distributed atop the collector plate 21 at the point where the end wall 36 can rest upon it and compress it. This serves as a heat block between the absorber plate 21 and the tank compartment to be formed by the shroud 38. Then, the front glazing panel 30 is cooperatively retained within the assembly. Last, the insulated shroud 38 is placed over the tank and screwed into place using sheet metal screws or the equivalent.

Following this, the homeowner can check for leaks, either using an inert gas system, or by filling the system with water.

It is also recommended that a bypass valve be employed between the feed pipe and return pipe, that is, between the main water supply and the main household water heater. The by-pass valve can be a three-way valve actuable manually to open or close the pipes going up to the solar collector water heater and down into the main hot water heater. This permits maintenance to be carried out on the solar collector water heater by closing off the collector flow without completely disrupting the hot water system.

The embodiment described herein is designed to heat water for domestic use, and has an overall length of six feet and width of four feet, with the insulation backboard 20 being approximately one inch thick, the absorber plate being about four feet by four feet, and the tank 27 having a capacity of about twenty-nine gallons. However, it should be understood that the invention is certainly not limited to solar collector systems of this particular size and shape or capacity.

The preferred embodiment employs as the solar heat transfer fluid Refrigerant 114, developed by DuPont. However, other fluids are available and could be employed, if desired. Also, the Tedlar glazing, which is a PVF (polyvinylfluoride) film, could be replaced with another suitable material. However, this particular material is preferred in that a Tedlar film 4 mils thick provides a lightweight, shock resistant, and transparent glazing panel which can be stretched and shrunk to take on the look of glass, and is a fraction of the cost and weight of the glass.

As a result of the present invention, the extrusions do not have to be held in close tolerance to provide consistency in the end fit. This structure also improves the strength of the collector framework through its capping system and multiple glazing framework.

The invention, of course, is not limited to the preferred embodiment, or to any of the modifications and variations discussed hereinabove. Many other modifications and variations would present themselves to those of skill in the art without departure from the scope and spirit of this invention as defined in the appended claims.

What is claimed is:

1. A solar collector water heater assembly comprising a rectangular insulation board serving as a base; a solar absorber plate mounted on the insulation board and including a heat exchanger with couplings for connection to a tank; a water tank having main water inlet and outlet means and means connected to the couplings of the heat exchanger; a main frame assembled onto the insulation board about the solar absorber plate including a front rail, a rear rail, side rails and cornerkeys joining adjacent ones of the rails at their ends to form corners of the frame; a tank bed attached within the frame and mounting the tank; and at least one glazing panel having a top surface including a pair of legs inwardly disposed therefrom and a sheet of transparent material stretched onto the glazing panel; one of the legs being insertably received and retained by a first depression formed in one of the rail members; another of the legs being insertably received and retained by a second depression formed in a glazing rim; and the top surface of one of the glazing panels being cooperatively retained adjacent to one of the rail members by a side cap and also retained adjacent to the glazing rim by an upper cap so that the glazing panel is securely retained within the assembly.

2. The solar collector water heater assembly of claim 1 wherein the side cap includes a projection extending inwardly thereof which abuts the top surface of the glazing panel restraining movement of the first leg within the first depression formed in one of the rail members.

3. The solar collector water heater assembly of claim 1 wherein the upper cap includes a projection extending inwardly thereof which abuts the top surface of the glazing panel restraining movement of the second leg within the second depression formed in the glazing rim.

4. The solar collector water heater assembly of claim 1 wherein one of the rail members includes a screw boss formed therein which receives a means for securely fastening the side cap adjacent to one of the rail members such that the glazing panel is securely retained within the assembly between the side cap and the rail member.

5. The solar collected water heater assembly of claim 1 wherein the glazing rim includes a screw boss formed therein which receives a means for securely fastening the upper cap to the glazing rim such that the glazing panel is securely retained within the assembly between the upper cap and the glazing rim.

6. The solar collector water heater assembly of claim 1 wherein the main frame and rail members are extruded aluminum.

7. The solar collector water heater assembly of claim 1 wherein one of the rail members and the glazing rim are cooperatively retained within the assembly by a connector.

8. A solar collector water heater assembly comprising a rectangular insulation board serving as a base; a solar absorber plate mounted on the insulation board and including a heat exchanger with couplings for connection to a tank; a water tank having main water inlet and outlet means and means connected to the couplings of the heat exchanger; a main frame assembled onto the insulation board about the solar absorber plate including a front rail, a rear rail, side rails and cornerkeys joining adjacent ones of the rails at their ends to form corners of the frame; a tank bed attached within the frame and mounting the tank; and at least one glazing panel with a sheet of transparent material stretched thereto; the glazing panel including a generally horizontal web member and a generally vertical web member being joined at a corner section; the glazing panel being securely mounted within the assembly within an opening formed between a glazing rim and an upper cap; the upper cap having a projection extending downwardly therefrom which cooperates with a flange outwardly disposed from the glazing rim to cooperatively retain the horizontal webb member within the opening; the upper cap further abutting the corner section to securely retain the generally vertical web member between a central web member of the glazing rim and the upper cap within the opening.

9. The solar collector water heater assembly of claim 8 wherein the generally horizontal web member is cooperatively retained between the projection and the flange.

10. The solar collector water heater assembly of claim 8 wherein the main frame and rail members are extruded aluminum.

11. The solar collector water heater assembly of claim 8 wherein the glazing rim includes a screw boss formed therein which receives means for securely fastening the upper cap to the glazing rim such that the glazing panel is securely retained within the opening formed between the upper cap and the glazing rim.

12. The solar collector water heater assembly of claim 8 wherein one of the rail members and the glazing rim are cooperatively retained within the assembly by a connector.

13. A method of installing a solar collector water heater comprising the steps of:

assembling a main frame over a base board by sliding corner keys into ends of a pair of side rails and a pair of ends rails, the base board having mounted thereon a solar absorber plate including a heat exchanger at one end of the absorber plate with couplings for connection to a tank;

installing a water tank onto the frame, the tank having a make-up water inlet, a heated-water outlet, a tank-to-heat exchanger coupling and a heat exchanger-to-tank coupling;

connecting the make-up water inlet to a source of water, the heated water outlet to an inlet of a hot water system, and the tank-to-heat exchanger coupling and the heat-exchanger-to-tank coupling to the associated couplings of the heat exchanger;

assembling onto the main frame at least one glazing panel having a top surface including a pair of legs inwardly disposed therefrom and a sheet of transparent material stretched onto the glazing panel;

assembling onto at least one of the rail members a glazing rim having a second depression formed therein;

assembling onto the glazing rim an upper cap to securely retain the glazing rim within the assembly;

retaining one of the legs of the glazing panel within a first depression formed in one of the rail members and retaining another of the legs of the glazing panel within the second depression; and retaining the top surface of the glazing panel within the assembly adjacent to one of the rail members by a side cap in abutting engagement therewith adjacent to the glazing rim by the upper cap in abutting engagement therewith to securely retain the glazing panel within the assembly.

14. A method of installing a solar collector water heater as in claim 13, further comprising fitting a shroud over the tank.

15. A method of installing a solar collector water heater as in claim 14, wherein the step of fitting the shroud includes installing a tank board between the rear end of the glazing panels and the tank, and affixing the tank shroud to the tank board.

16. A method of installing a solar collector water heater as in claim 13, further comprising assembling a connector to cooperatively retain one of the rail members and the glazing rim within the assembly.

17. A method of installing a solar collector water heater as in claim 13, further comprising restraining movement of the second leg within the second depression by a projection extending inwardly of the upper cap abutting the top surface of the glazing panel.

18. A method of installing a solar collector water heater as in claim 13, further comprising restraining movement of the first leg within the first depression by a projection extending inwardly of the side cap abutting the top surface of the glazing panel.

19. A method of installing a solar collector water heater as in claim 13, further comprising fastening the side cap adjacent to one of the rail members by one of the rail members having a screw boss formed therein receiving and retaining a fastener such that the glazing panel is securely retained within the assembly between the side cap and the rail member.

20. A method of installing a solar collector water heater as in claim 13, further comprising fastening the upper cap adjacent to the glazing rim as a result of the glazing rim having a screw boss formed therein receiving and retaining a fastener such that the glazing panel is securely retained within the assembly between the upper cap and the glazing rim.

21. A method of installing a solar collector water heater comprising the steps of:
assembling a main frame over a base board by sliding corner keys into ends of a pair of side rails and a pair of end rails, the base board having mounted thereon a solar absorber plate with couplings for connection to a tank;
installing a water tank onto the frame, the tank having a make-up water inlet, a heated-water outlet, a tank-to-heat exchanger coupling and a heat-exchanger-to-tank coupling;
connecting the make-up water inlet to a source of water, the heated water outlet to an inlet of a hot water system, and the tank-to-heat exchanger coupling and the heat exchanger-to-tank coupling to the associated couplings of the heat exchanger;
assembling onto at least one of the rail members a glazing rim having a flange outwardly disposed therefrom;
assembling onto the glazing rim an upper cap to securely retain the glazing rim within the assembly having a projection extending downwardly therefrom;
mounting within the assembly at least one glazing panel with a sheet of transparent material stretched thereto and having a generally horizontal web member and a generally vertical web member being joined at a corner section within an opening formed between the glazing rim and the upper cap; and
retaining within the opening the glazing panel as a result of the flange and projection cooperatively abutting the horizontal web member of the panel glazing.

22. A method of installing a solar collector water heater as in claim 21, further comprising fitting a shroud over the tank.

23. A method of installing a solar collector water heater as in claim 22, wherein the step of fitting the shroud includes installing a tank board between the rear end of the glazing panels and the tank, and affixing the tank shroud to the tank board.

24. A method of installing a solar collector water heater as in claim 21, further comprising retaining the generally vertical web member between a central web member of the glazing rim and the upper cap as a result of the upper cap abutting and restraining the corner section.

25. A method of installing a solar collector water heater as in claim 21, further comprising fastening the upper cap to the glazing rim as a result of the glazing rim having a screw boss formed therein receiving and retaining a fastener such that the glazing panel is securely retained within the assembly between the upper cap and the glazing rim 26. A method of installing a solar collector water heater as in claim 21, further comprising assembling a connector to cooperatively retain one of the rail members and the glazing rim within the assembly.

27. A kit for construction of a solar collector water heater suitable for installation by a homeowner, comprising
a rectangular insulation board serving as a base;
a solar absorber plate mountable on the insulation board and including a heat exchanger with couplings for connection to a tank;
a water tank having main water inlet and outlet means and means for connecting to the couplings of the heat exchanger;
a main frame assemblable onto the insulation board with the solar absorber plate mounted thereon including a front rail, a rear rail, side rails, and corner keys for joining adjacent ones of the rails at their ends to form corners of the frame;
a tank bed attachable onto the frame for mounting the tank;
a glazing rim assemblable onto at least one of the rail members and having a second depression formed therein and a first projection extending downwardly therefrom;
an upper cap assemblable onto the glazing rim having a second projection to securely retain the glazing rim within the heater a side cup assemblable onto one of the rail members;
at least one side glazing panel having a top surface including a pair of legs inwardly disposed therefrom and a sheet of transparent material stretched onto the glazing panel assemblable and mountable within the heater by one of the legs being retained within first depression formed in one of the rail members and another of the legs being retained within the second depression and the top surface being retained adjacent to one of the rail members by the side cap in abutting engagement therewith and adjacent the glazing rim by the upper cap in abutting engagement therewith; and
another of the top glazing panels having a sheet of transparent material stretched thereto mountable and retainable within an opening formed between the glazing rim and the upper cap.

28. A kit for construction of a solar collector water heater as in claim 27, wherein the main rails and the rail members are extruded aluminum.

29. A kit for construction of a solar collector water heater as in claim 27, wherein the top glazing panel includes a generally horizontal web member and a vertical web member being joined at a corner section.

30. A kit for construction of a solar collector water heater as in claim 29 wherein the top glazing panel is secured within the opening by the flange and second projection cooperatively abutting the horizontal web member of the panel glazing.

31. A kit for construction of a solar collector as in claim 29 wherein the generally horizontal web member is cooperatively retained between the projection and the flange.

32. A kit for construction of a solar collector as in claim 29 wherein the upper cap abuts the corner section to securely retain the generally vertical web member between a central web member of the glazing rim and the upper cap.

33. A kit for construction of a solar collector water heater as in claim 27 wherein the side cap includes a third projection extending inwardly thereof which abuts the top surface of the glazing panel restraining movement of the first leg within the first depression formed in one of the rail members.

34. A kit for construction of a solar collector water heater as in claim 27 wherein the second projection of the upper cap abuts the top surface of the side glazing panel restraining movement of the second leg within the second depression.

35. A kit for construction of a solar collector water heater as in claim 27 wherein one of the rail members includes a screw boss formed therein which receives a means for securely fastening the side cap adjacent to one of the rail members such that the glazing panel is securely retained within the assembly between the side cap and the rail member.

36. A kit for construction of a solar collector water heater as in claim 27 wherein the glazing rim includes a screw boss formed therein which receives a means for securely fastening the upper cap to the glazing rim such that one of the glazing panels is securely retained within the assembly between the upper cap and the glazing rim.

37. A kit for construction of a solar collector as in claim 27 wherein one of the rail members and glazing rim are cooperatively retained within the assembly by a connector.

* * * * *